(12) United States Patent
Bjork et al.

(10) Patent No.: US 9,844,819 B2
(45) Date of Patent: Dec. 19, 2017

(54) TWIST DRILL FOR METAL MACHINING

(71) Applicant: SECO TOOLS AB, Fagersta (SE)

(72) Inventors: Anders Bjork, Soderkoping (SE); Par Nordberg, Soderkoping (SE); Christian Carlsson, Skarblacka (SE)

(73) Assignee: SECO TOOLS AB, Fagersta (SE)

( * ) Notice: Subject to any disclaimer, the term of this patent is extended or adjusted under 35 U.S.C. 154(b) by 0 days.

(21) Appl. No.: 14/900,252

(22) PCT Filed: Jun. 9, 2014

(86) PCT No.: PCT/EP2014/061937
§ 371 (c)(1),
(2) Date: Dec. 21, 2015

(87) PCT Pub. No.: WO2014/206716
PCT Pub. Date: Dec. 31, 2014

(65) Prior Publication Data
US 2016/0151842 A1    Jun. 2, 2016

(30) Foreign Application Priority Data
Jun. 28, 2013 (EP) .................................... 13174225

(51) Int. Cl.
*B23B 51/02* (2006.01)
*B23B 51/06* (2006.01)

(52) U.S. Cl.
CPC .............. *B23B 51/06* (2013.01); *B23B 51/02* (2013.01); *B23B 2222/28* (2013.01);
(Continued)

(58) Field of Classification Search
CPC .............. Y10T 408/455; Y10T 408/78; Y10T 408/909; Y10T 408/9097; B23B 51/02;
(Continued)

(56) References Cited

U.S. PATENT DOCUMENTS

| | | | | |
|---|---|---|---|---|
| 4,583,888 A | * | 4/1986 | Mori ...................... | B23B 51/02 408/144 |
| 4,983,079 A | * | 1/1991 | Imanaga ................. | B23B 51/02 408/144 |

(Continued)

FOREIGN PATENT DOCUMENTS

| | | | | |
|---|---|---|---|---|
| JP | 60056809 A | * | 4/1985 | ............. B23B 51/02 |
| JP | 02237712 A | * | 9/1990 | |

(Continued)

*Primary Examiner* — Daniel Howell
(74) *Attorney, Agent, or Firm* — Corinne R. Gorski

(57) ABSTRACT

A long twist drill includes a shank and a drill body having a drill tip (16). The twist drill has a length L and an outer diameter D, and has a cemented carbide or high speed steel substrate and a coating of at least one layer. The quota L/D is at least 16. The twist drill has two cutting segments at the tip and two flutes chip. The twist drill is provided with holes for fluid opening in the tip. The twist drill has an axial web thinning angle GAA, which is 40 to 50°. The twist drill further has a web that back tapers such that a web diameter gets smaller in a direction away from the tip towards the shank within an axial distance.

19 Claims, 4 Drawing Sheets

(52) U.S. Cl.
CPC ....... *B23B 2222/32* (2013.01); *B23B 2228/10* (2013.01); *B23B 2251/04* (2013.01); *B23B 2251/14* (2013.01); *B23B 2251/402* (2013.01); *B23B 2251/422* (2013.01); *Y10T 408/9097* (2015.01)

(58) Field of Classification Search
CPC ............ B23B 2224/24; B23B 2228/10; B23B 2251/14; B23B 2251/18; B23B 2251/241; B23B 2251/244; B23B 2251/402; B23B 2251/422; B23B 2251/408
See application file for complete search history.

(56) References Cited

U.S. PATENT DOCUMENTS

| | | | |
|---|---|---|---|
| 5,678,960 A * | 10/1997 | Just | B23B 51/02 408/147 |
| 7,740,426 B2 * | 6/2010 | Yamamoto | B23B 51/02 408/230 |
| 7,762,748 B2 * | 7/2010 | Yanagida | B23B 51/06 408/230 |
| 2004/0101379 A1 | 5/2004 | Mabuchi et al. | |
| 2006/0275092 A1 | 12/2006 | Yamamoto | |
| 2009/0047080 A1 | 2/2009 | Schweighofer et al. | |
| 2009/0279965 A1 | 11/2009 | Soittu | |

FOREIGN PATENT DOCUMENTS

| | | | |
|---|---|---|---|
| JP | 2001079707 A | | 3/2001 |
| JP | 2002126925 A | * | 5/2002 |
| JP | 2005022064 A | * | 1/2005 |
| JP | 2005144640 A | * | 6/2005 |
| JP | 2007276076 A | | 10/2007 |
| JP | 2008142834 A | | 6/2008 |
| JP | 2009018360 A | * | 1/2009 |
| JP | 2012020357 A | * | 2/2012 |

* cited by examiner

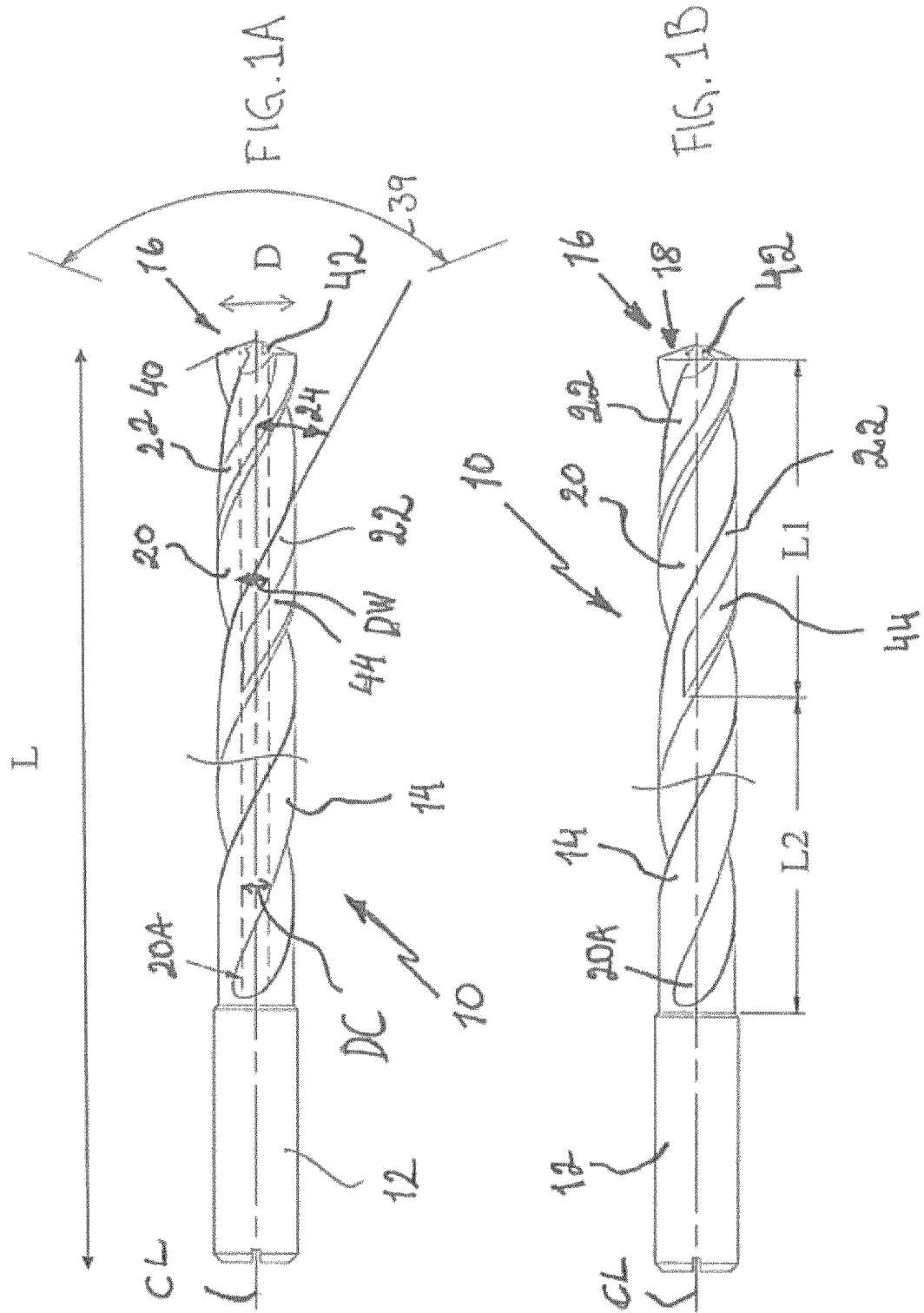

TWIST DRILL FOR METAL MACHINING

RELATED APPLICATION DATA

This application is a §371 National Stage Application of PCT International Application No. PCT/EP2014/061937 filed Jun. 9, 2014 claiming priority of EP Application No. 13174225.6, filed Jun. 28, 2013.

BACKGROUND OF THE INVENTION

The present invention relates to a long twist drill for metal machining.

Deep hole drilling applications can often be found in the automotive, mould & die industries and general engineering. During metal cutting operation chips are produced at the tip end of the shank of the twist drill, said chips being formed and transported from the tip end of the shank of the twist drill to the opposite end of the shank of the twist drill. In metalworking industries there are numerous deep holes produced daily. Deep holes can be defined as being at least 15 times the hole diameter. Drilling tools predominantly used nowadays, such as gun drills and HSS drills usually result in very long process times. In general, drilling becomes more and more difficult with increasing drilling depth. More recent drills have pushed the constraints of tool design further than ever by using a solid carbide twist drill with internal coolant supply to meet the demands of deep hole drilling. The new twist drills can be used for most materials and are very tolerant in terms of the coolant type and feed applied. During rotation the chips are forced out of the hole by a drill helix and chip transport takes place in flutes. This allows the reliable transport of large, jamming chips such as the ones produced by long-chip materials. The chip transport is particularly important when the drilled depth is relatively large compared to the nominal diameter. Twist drills are often coated with a hard material to increase tool life by enhancing the wear resistance. JP 2007276076 discloses a long twist drill. In spite of the recent developments there is a need to further optimize the long twist drills.

OBJECTS AND SUMMARY OF THE INVENTION

An object of the present invention is to provide a twist drill optimized for drilling deep holes, inter alia by keeping low cutting forces and good chip flow and drilling holes with good accuracy and surface finish while maintaining favourable production rates.

BRIEF DESCRIPTION OF THE DRAWINGS

The features and advantages of the present invention are well understood by reading the following detailed description in conjunction with the drawings in which like numerals indicate similar elements and in which:

FIGS. 1A and 1B are identical side views of a twist drill according to an aspect of the present invention;

DETAILED DESCRIPTION

Figure 1C:
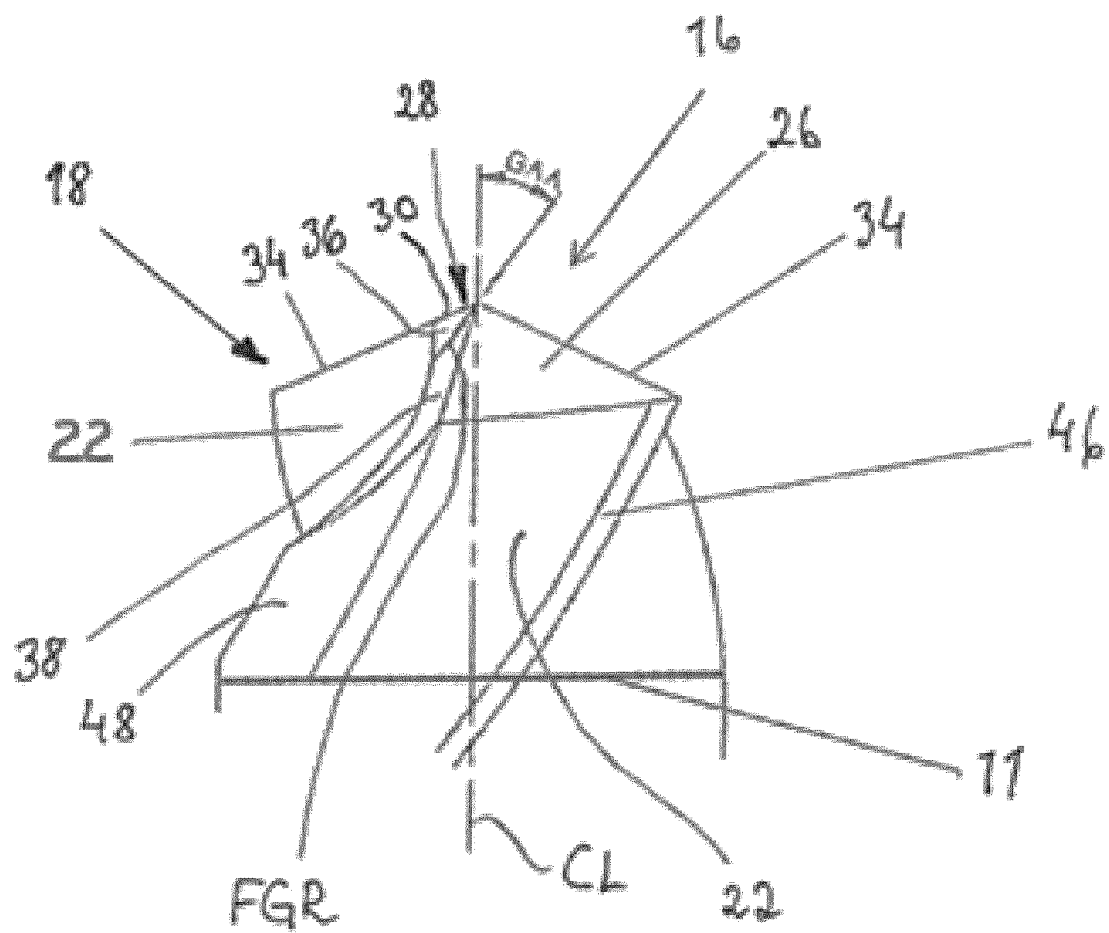
FIG. 1C is an enlarged view of a portion of the twist drill tip of FIG. 1A or 1B.
Figure 1D:
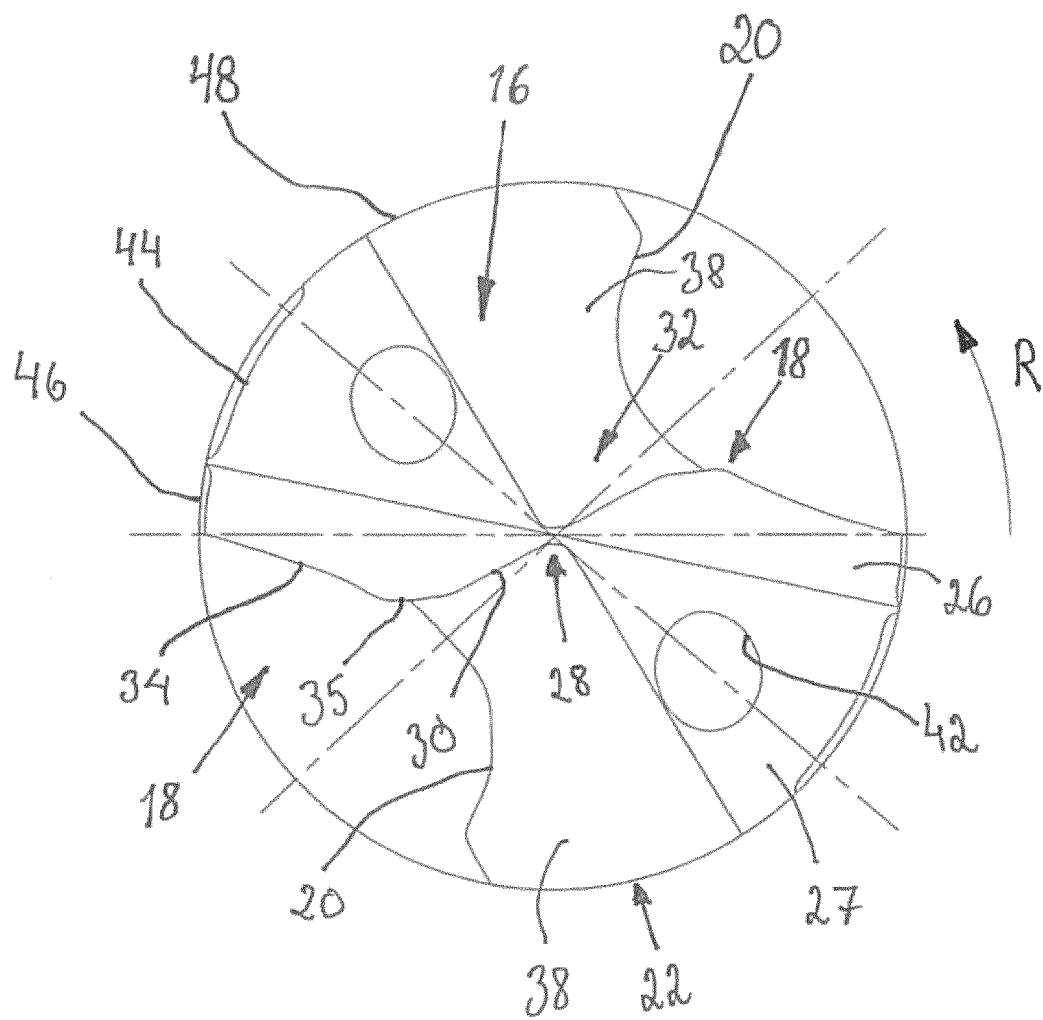
FIG. 1D is an enlarged forward end view of the twist drill tip of FIG. 1A or 1B.

The present invention relates to a twist drill 10 comprising a shank 12 and a drill body 14 having a drill tip 16 as seen in FIGS. 1A, 1B, 1C and 1D. The twist drill 10 is preferably a coated twist drill comprising a substrate body, preferably of cemented carbide or high speed steel, and a coating comprising at least one layer or coating 11, depicted by a line in FIG. 1C. The number of wear resistant coatings may be one or more. The layer is deposited on a tip area, defined as the area reaching from the tip of the twist drill up to a distance, towards the shank 12, of about 5 to 20 mm, preferably about 10 mm. In one embodiment of the present invention, a first layer is a multilayered structure varying (Ti,Al)N layer. The individual layers of the first and/or second layers comprises metalnitrides where one or more of the metal elements are selected from titanium (Ti), aluminum (Al), silicon (Si), chromium (Cr), niobium (Nb), hafnium (Hf), vanadium (V), tantalum (Ta), molybdenum (Mo), zirconium (Zr), tungsten (W), preferably from titanium (Ti), aluminum (Al), silicon (Si), chromium (Cr). The suitable total thickness of the first and second layer respectively is determined by the chemical composition of the coating as well as by the exact geometry of the drill. It may be advantageous to provide the first and second layers with different colors.

The shank and the twist drill body are preferably, at least partly, cylindrical about a longitudinal centre axis CL. The twist drill preferably has a maximum diameter D of from about 3 to about 12 mm, preferably from about 6.0 to about 8 mm. The shank 12 is suitable for insertion into a holder. The twist drill has a total length L. A quota L/D may be chosen within a range of 30 to 50. The drill body 14 has a length which can be divided into two lengths L1 and L2, see FIG. 1B. The total length of the twist drill is the shank length plus the lengths L1 and L2. The length L2 may be 2 to 7 times longer than the length L1.

The twist drill tip or forward end 16 may have two identical cutting segments 18 and may have two identical flutes 20. The cutting segments 18 and flutes 20 are equally spaced circumferentially about the longitudinal centre axis or axis of rotation CL. The axis of rotation thus defines a forward-to-rear direction of the twist drill 10, with the twist drill tip 16 being at the forward end. Two flutes 20 extend helically from the tip 16 to an end 20A in the vicinity of the shank 12. A typical value for the helix angle 24 in the axial mid region of the twist drill body 14 is 20° to 30°. Two lands 22 are created when the flutes 20 are produced in the drill blank, which lands also extend helically. The lands 22 bridge the flutes 20 in the circumferential direction of the twist drill. Each cutting segment 18 has a first segment relief surface 26, which extends radially outwardly, away from the axis of rotation CL to a peripheral surface of the land 22 and may have a second segment relief surface 27. The first segment relief surface 26 forms a first relief surface and the second segment relief surface 27 forms a second relief surface. A chisel edge 28 is located at the front end of the twist drill 10. The chisel edge 28 has a length of 0.25 to 0.40 mm. The chisel edge 28 is defined by two chisel sub-edges 30. Each chisel sub-edge 30 is formed by intersection of an adjacent segment relief surface 26 and a gash 32. The gash 32 extends axially about halfway to a line intersecting the radially outer ends of the main cutting edges 34 in a view like FIG. 1C. The flute 20 meets the relief surface 26 at a main cutting edge 34. The main cutting edge is shown partly concave but may be straight or convex, and the main cutting edges may approximately be parallel with each other. The two main cutting edges form an obtuse point angle 39 of 120 to 150°, preferably about 130 to 140°. An intermediate cutting edge 35 may form a transition area between the chisel sub-edge 30 and the main cutting edge 34.

The intermediate cutting edge 35 may be substantially straight and connects to the chisel sub-edge 30 and the main cutting edge 34 via radii. An extension of the intermediate cutting edge 35 may intersect the periphery of the twist drill at or close to the first margin 46 at an opposed side of the chisel edge 28 when viewed in an end view like in FIG. 1D.

The gash 32 has first and second gash surfaces 36, 38. The first and second gash surfaces 36, 38 may be perpendicular to each other, or form an obtuse angle of preferably 91 to 93°. The first gash surface 36 may be planar. The first gash surface 36 meets the first segment relief surface 26 at the chisel sub-edge 30. The second gash surface 38 may connect to the second segment relief surface 27, and may be planar or concave, and may connect to a chip flute 20. The first and second gash surfaces 36, 38 meet at a line or curve FGR which substantially forms an axial web thinning angle GAA with the centre axis CL. In accordance with some embodiments, the angle GAA may be in the range of 40 to 50°, preferably 42 to 46°, and most preferably about 44°. In case the line is a curve FGR, it is approximated by a line intersecting the end points thereof to define the angle GAA together with the centre axis CL. The angle GAA of for example about 44° together with a web or core diameter of 0.4×D at the tip 16 creates a small, easy movable chip. The web or core diameter of 0.4×D is measured closest to the tip 16 without being affected by the gashes 32. The web thickness is here defined as the thickness of the web, in an end view, being affected by the gashes 32. The web thickness may be 0.12 to 0.18 mm.

In the twist drill, a back taper of web or core diameter may be applied. The web or core is the metal column, shown in phantom in FIG. 1A, which separates the flutes 20. The web diameter DW may contract continuously in direction from the tip 16 or a tip side 40 towards the shank within an axial distance L1. The web diameter DW may contract continuously as 0.33 to 0.35 mm per 100 mm. The web diameter DW changes according to the formula −0.0047×X, wherein X equals the distance from the tip side 40. The web diameter DW at the tip side 40 maybe for example, for twist drill diameter of 6.5 mm, 0.4×DW=2.6 mm which changes to 0.364DW mm (0.4×6.5−0.0047×50=0.364DW mm), i.e. about 2.37 mm at 50 mm from the tip side 40. For a 30×D, for a twist drill diameter of 6.5 mm, it means 0.25×D at length L1. The cut chips will therefore have more space in the chip flutes 20 as they travel away from the tip side 40. This provides less hole wall wear and less cutting forces.

The back taper ends at length L1 and transfers into a cylindrical core or web with a constant diameter DC along most of the length L2. The axially inner end 20A of the flute 20 may be shallower than the rest of the flute 20 to avoid sudden dimensional changes.

In the twist drill, a back taper of the twist drill outer diameter D may also be applied. Back taper of the twist drill diameter D may be 0.33 to 0.35 per 100 mm within the range of the length L1, such as for the 50 first mm from the tip side 40. The twist drill outer diameter D is substantially constant axially rear of the discussed outer back taper.

Each land 22 comprises a helical recess 44 extending within the range of the length L1, such as for the 50 first mm from the tip side 40. Each recess 44 creates a first margin 46 and a second margin 48 in the land 22 for supporting the drill in the hole. The terms "leading" and "trailing" refer to a rotational direction R of the twist drill. All margins are preferably located on a common circle in a given axial cross-section and are preferably coaxial with the longitudinal centre axis CL. The new drill has four-facet point geometry for good centering capability. The double margins of the twist drill not only have influence on the guiding functions, but may also reduce the cutting torque.

The chip flutes 20 are preferably polished to a surface fineness Ra of more than 0.001 but less than 0.1 μm, preferably to the range of 0.030 to 0.055 μm along at least at 80% of the axial extension of the flute from the tip end. Such surface fineness makes flow of chips and liquid uninterrupted.

The twist drill 10 is provided with holes 42 for fluid opening in the tip 16 or in the relief segments 27 for transport of fluid to wash away chips and to cool and lubricate the twist drill.

Figure 2:
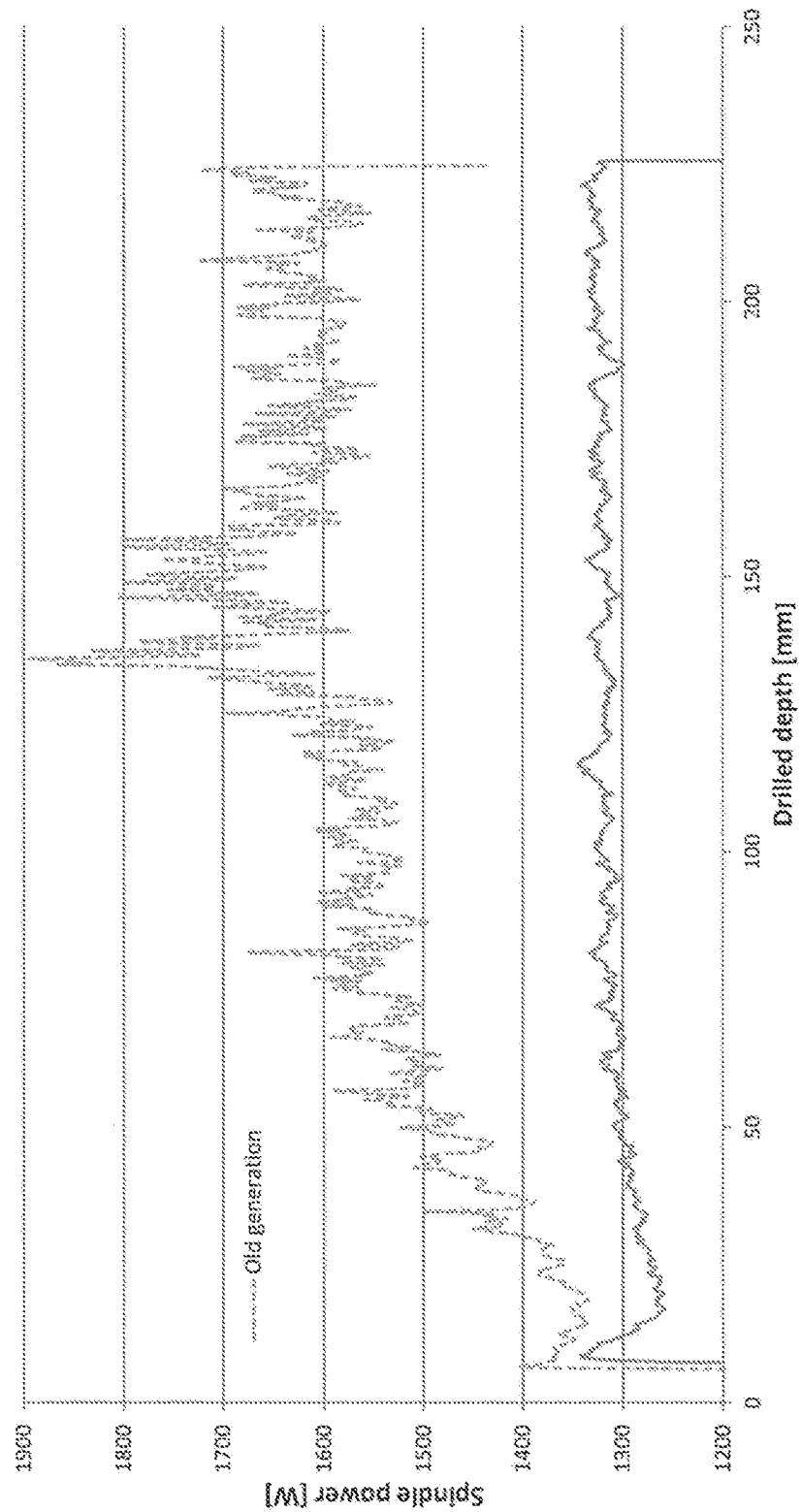
FIG. 2 is a graph comparing a long twist drill according to an aspect of the present invention with a prior long twist drill.

FIG. 2 is a graph comparing a long twist drill according to an aspect of the present invention with a prior long twist drill ("Old generation"). Two drills of each drill type were tested in a drilling operation during the following cutting conditions: Work piece material: SS-2541 SECO group 5, axial drilling in a rod with a diameter of 140 mm. Operation: Drilling with drill diameter of 6.5 mm and hole depth of not more than 225 mm.

Cutting Conditions:
Cutting speed Vc [m/min]=80
Feed per revolution [mm/rev]=0.15
Wet conditions with coolant emulsion ~12%, internal coolant.

The total length L of the new twist drill, or the twist drill according to an aspect of the present invention, is 279 mm and the old generation twist drill length is 279 mm. The test set-up was identical for both drill types. The drills drilled 34.6×D deep. Both drill types were coated by ten layers of TiAlN and then one layer of TiN within the L1 area.

Relevant features of the two different drill types are shown in the table below.

| Feature | New twist drill | Old generation |
| --- | --- | --- |
| Twist drill length L (mm) | 279 | 279 |
| Drilled hole depth (mm) | 225 | 225 |
| Twist drill diameter (mm) | 6.5 | 6.5 |
| Back taper within L1 | 0.35/100 at 50 mm | 0.35/100 |
| Back taper outer diameter | 0.35/100 at 50 mm | 0.35/100 |
| Web at flute end (20 A) | 0.25×D | 0.25×D |
| Coatings materials | TiAlN and TiN | TiAlN and TiN |
| Quota L/D | 42.9 | 42.9 |
| Drill depth/D | 34.6 | 34.6 |
| Chisel edge length (mm) | 0.25 | 0.20 |
| Web thickness (mm) | 0.12 | 0.08 |
| Flute surface fineness Ra (μm) | 0.04 | 0.09 |
| Angle GAA (°) | 44 | 34 |
| Web at forward end (40) | 0.4×D | 0.3×D |
| Web back taper | 0.42/100 | 0.14/100 |
| Power req. average at depth > 16×D | 1320 W | 1580 W |

Drilling cycle: All test drillings were made using predrilled holes or pilot holes with diameter 6.6 mm and 20 mm hole depth to reduce risks for drill breakage.

One Drilling Cycle:
1. Spindle start n=100 rpm
2. Go down to 16 mm with f=295 [mm/min] (which is 50% of full drilling feed)
3. Start spindle n=3920 rpm
4. Internal coolant start
5. Full depth drilling
6. Go back −1 mm
7. Reduce spindle speed to 100 rpm
8. Stop coolant
9. Go back to 5 mm above material The results can be seen in FIG. 2. The spindle power needed for drilling as shown is the average of 10 holes drilled by each type of drill. The power requirement average at depths of more than (>) 16×D was 1320 W for the new twist drill and 1580 W for the old generation drill, i.e. the new twist drill required about 16% less spindle power.

The provision of a largest web diameter DW at the tip 16 compacts the chips more than old generation drills do, such that the spring back or rebound of each chip will require less space to travel in the flutes. On the other hand, the new twist drill will require relatively more spindle power initially as can be seen in FIG. 2 before reaching breakeven with the old generation drills at about 50 mm in drilled depth. The required spindle power is substantially constant, between 1300 and 1350 W, for the new twist drill to a large extent due to favourable chip transport. The old generation twist drills exhibit varying spindle power, between 1440 and 1900 W, probably due to chip flow disturbances at depths of more than about 50 mm.

It is evident that the combination of features in a twist drill according to the present invention provides numerous advantages such as excellent hole quality, lower power requirements, less noise, long consistent tool life and smaller chips than old generation twist drills.

Although the present invention has been described in connection with preferred embodiments thereof, it will be appreciated by those skilled in the art that additions, deletions, modifications, and substitutions not specifically described may be made without departing from scope of the invention as defined in the appended claims.

The disclosures in EP Patent Application No. 13174225.6, from which this application claims priority, are incorporated herein by reference.

The invention claimed is:

1. A twist drill comprising:
a shank;
a drill body having a drill tip, and having a length and an outer diameter, and including a cemented carbide or high speed steel substrate and a coating having at least one layer, wherein a quota L/D is at least 16;
two cutting segments at the tip and two chip flutes;
a plurality of holes for fluid opening in the tip;
an axial web thinning angle, wherein the axial web thinning angle is 40 to 50°; and
a web which back tapers from such that a web diameter gets smaller in a direction away from the tip towards the shank within an axial distance, wherein the back taper ends at the axial distance and transfers into a cylindrical web with a constant diameter.

2. The twist drill of claim 1, wherein the web diameter contracts continuously at a rate of 0.33 to 0.35 mm per 100 mm.

3. The twist drill of claim 1, wherein the chip flute has a surface fineness of more than 0.001 but less than 0.1 μm, along at least at 80% of an axial extension of the flute.

4. The twist drill of claim 1, wherein the layer is deposited on a tip area, defined as the area reaching from the tip of the twist drill up to a distance towards the shank of about 5 to 20 mm.

5. The twist drill of claim 1, wherein the outer diameter back tapers such that it is smaller in direction away from the tip towards the shank within the axial distance.

6. The twist drill of claim 5, wherein the outer diameter contracts continuously at a rate of 0.33 to 0.35 mm per 100 mm.

7. The twist drill of claim 6, wherein the back taper ends at the axial distance and transfers into a cylinder with a constant diameter.

8. The twist drill of claim 4, wherein the layer includes a first layer having a multilayered structure covering only the tip area of the drill, and a second layer having a multilayered structure covering the first layer at only the tip area of the drill.

9. The twist drill of claim 8, wherein the first layer and second layers are comprised of metalnitrides where metal elements are selected from titanium (Ti), aluminum (Al), silicon (Si), chromium (Cr), niobium (Nb), hafnium (Hf), vanadium (V), tantalum (Ta), molybdenum (Mo), zirconium (Zr), tungsten (W), and mixtures thereof.

10. The twist drill of claim 1, wherein the quota L/D is within the range of 30 to 50.

11. The twist drill of claim 1, wherein a chisel edge is located at the front end of the twist drill.

12. The twist drill of claim 1, wherein the web thickness is 0.12 to 0.18 mm.

13. The twist drill of claim 1, wherein each cutting segment has a first segment relief surface and a second segment relief surface, which extend radially outwardly, away from an axis of rotation towards a peripheral surface of the drill, wherein the first segment relief surface forms a first relief surface and the second segment relief surface forms a second relief surface.

14. The twist drill of claim 13, wherein the chisel edge is defined by two chisel sub-edges, each said chisel sub-edge being formed by an intersection of an adjacent segment relief surface and a gash, and wherein the gash includes first and second gash surfaces, the first gash surface meeting the first segment relief surface and the second gas surface being connected to the second segment relief surface.

15. The twist drill of claim 1, wherein the axial web thinning angle is between 42 to 46°.

16. The twist drill of claim 1, wherein the axial web thinning angle is about 44°.

17. The twist drill of claim 1, wherein the chip flute has a surface fineness in the range of 0.03 to 0.055 μm along at least at 80% of an axial extension of the flute.

18. The twist drill of claim 1, wherein the layer is deposited on a tip area, defined as the area reaching from the tip of the twist drill up to a distance towards the shank of about 10 mm.

19. The twist drill of claim 11, wherein the chisel edge has a length of 0.25 to 0.40 mm.

* * * * *